United States Patent [19]  [11]  4,420,297
Remon  [45]  Dec. 13, 1983

[54] RETRACTABLE APPARATUS FOR SHOE SOLE MOLDS

[75] Inventor: Francis O. Remon, Beverly, Mass.

[73] Assignee: USM Corporation, Farmington, Conn.

[21] Appl. No.: 257,902

[22] Filed: Apr. 27, 1981

[51] Int. Cl.³ ............................................. A23P 1/00
[52] U.S. Cl. .................................. 425/577; 264/328.7
[58] Field of Search ................ 425/324.1, 525, 527, 425/352, 356, 577, 561; 264/328.7

[56] References Cited

U.S. PATENT DOCUMENTS

| | | | |
|---|---|---|---|
| 2,615,111 | 10/1952 | Paquetti et al. | 425/357 |
| 2,777,164 | 1/1957 | Strahm | 425/577 |
| 2,994,921 | 8/1961 | Hultgren | 425/577 |
| 3,059,305 | 10/1962 | Brozdowicz | 425/352 |
| 3,315,309 | 4/1967 | Braun | 425/352 |
| 3,341,897 | 9/1967 | Susuki et al. | 425/577 |
| 3,487,140 | 12/1969 | Lauk et al. | 425/356 |
| 3,496,330 | 12/1976 | Jones et al. | 425/577 |
| 3,524,224 | 8/1970 | Marcus | 425/577 |
| 3,595,301 | 7/1971 | Bauer | 425/577 |
| 3,649,728 | 3/1972 | Honsho et al. | 425/577 |
| 3,743,467 | 7/1973 | Lopez | 425/525 |
| 3,924,993 | 12/1975 | Terrell | 425/577 |
| 3,968,951 | 7/1976 | Zeman | 425/577 |
| 3,983,199 | 9/1976 | Uhlig | 425/525 |
| 4,123,217 | 10/1978 | Fischer et al. | 425/324.1 |

FOREIGN PATENT DOCUMENTS

| | | | |
|---|---|---|---|
| 51-68666 | 6/1976 | Japan | 425/577 |
| 861823 | 3/1961 | United Kingdom | 425/577 |

Primary Examiner—Jay H. Woo
Attorney, Agent, or Firm—Donald N. Halgren

[57] ABSTRACT

A shoe sole mold for molding unit soles comprised of plastic-like material, where one of the mold halves has a retractable channel forming mechanism or design forming wall portion therein. The retractable mechanism may be used to fabricate holes in the sole or make a design in the wall of the sole during injection of the material into the mold cavity. The mechanism is then retracted into its respective mold and leaves behind a formed channel or image arranged in the unit sole material after it has set, and which unit sole may then be removed from the mold cavity. The channels or holes in the soles may then be used to secure straps or the like to the soles during subsequent manufacture of sandals or the like.

1 Claim, 2 Drawing Figures

RETRACTABLE APPARATUS FOR SHOE SOLE MOLDS

BACKGROUND OF THE INVENTION (1) Field of the Invention

This invention relates to shoe sole molding, and more particularly to the manufacture of shoe soles by the injection of a settable fluid material into a cavity of a unique sole mold having a retractable form mechanism therewithin.

(2) Prior Art

Unit soles comprised of injectable plastic-like material have come on the market to compete with inexpensively manufactured shoes from foreign countries. These unit soles are utilized on all types of footwear, from boots, to shoes, to sandals. In the manufacture of unit soles for sandals, a method was needed to secure the straps which may comprise the upper, to the sole, in a manner which is cost effective, comfortable to the wearer, and which provides a long service life.

Sewing the straps to the sole liner may fit several of these requirements, but that method may also be uncomfortable to the user and may not hold together for several seasons of wear.

Footwear manufacturers subsequently tried manual drilling of the sole material to fabricate the holes at a slight angle to the bottom of the soles, that is, through the side wall of the sole and out the top surface of the sole near the edge thereof, to provide a hole or channel by which the straps or upper may be secured to the sole. This method of making the holes or channels in the soles is a time consuming, error-prone activity.

It is an object of the present invention to obviate the problems associated with the prior art attempts at manufacturing unit soles, especially unit soles for sandals.

It is a further object of the present invention, to eliminate one of the time consuming hand operations of the footwear manufacturer.

It is yet a further object of the present invention, to provide an apparatus for producing the desired holes or channels in the unit soles while they are still in the mold cavity and which apparatus may be retracted from the molded sole to allow the sole to be easily removed from the mold cavity, particularly since the channel forming mechanism might be obtuse with or otherwise get in the way of direct removal of the molded sole from the cavity.

BRIEF SUMMARY OF THE INVENTION

The present invention comprises a unit sole mold mechanism for emplacing particular channels or holes for straps or the like in unit soles as they are molded. The mechanism comprises an arrangement of reciprocably movable biased pins which are actuatably moved into the mold cavity by a shaft on a piston in a pressurizable air cylinder which itself is actuated during the injection of plastic material into the mold cavity. Upon a proper time lapse when the material in the mold has set properly, the pressure on the cylinder is released and its associated piston and shaft thereon is retracted to permit the biased pins to pull themselves free from the material. The retracted pins thus leave an arrangement of channels in the plastic material in the mold which material now defines a unit sole. The sole may then be easily removed from the cavity, once the cavity has been opened, whereupon the mold may be reassembled, ready for a subsequent injection of material, and the mold mechanism may be subsequently actuated to fabricate further channels or holes therein. The retractable pins may also have a segment of the side wall portion of the mold cavity attached to their distal ends to permit the fabrication of a relief on the sides of a unit sole. Retraction of the sculptured wall portion into the mold member thus would also facilitate removal of the sole from the mold cavity.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
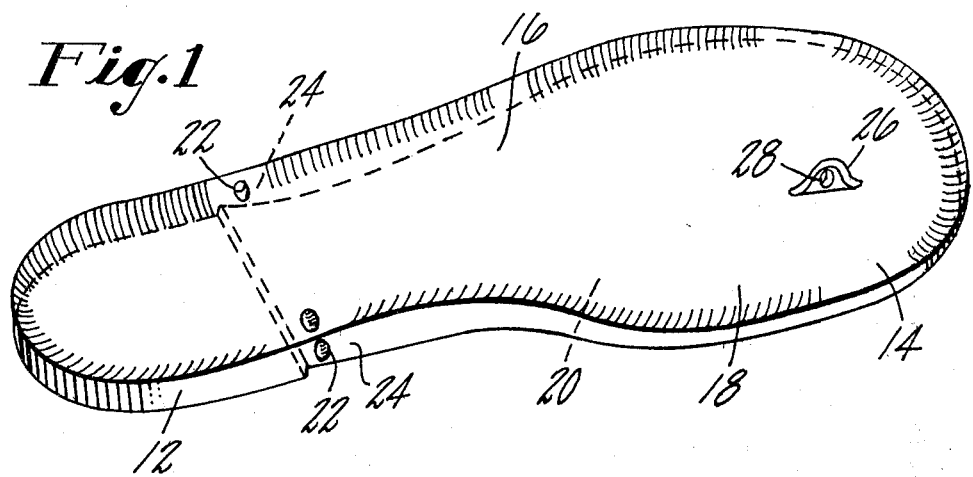
FIG. 1 is a perspective view of a unit sole constructed according to the principles of the present invention.

Referring now to the drawings in detail, and particularly to FIG. 1, there is shown a unit sole 10, fabricated from an injectable thermoplastic material or the like in a cavity typically formed between an upper and a lower mold half. The unit sole 10 shown in FIG. 1, has a heel portion 12, a toe portion 14, and an intermediate or waist portion 16. The unit sole 10 also has a generally concave surface 18 on which an upper insole, not shown, may be attached, and it may have a tread surface 20, which generally defines that portion of the unit sole 10 which would normally strike the ground when on a user's foot.

A pair of channels 22 are shown in FIG. 1, extending from the upper surface 18 through a section of the unit sole 10, and out a side portion 24 thereof. A tab 26 may extend up from the concave surface 18 at the toe portion 14 of the unit sole 10, and may have a channel 28 extending therethrough.

Figure 2:
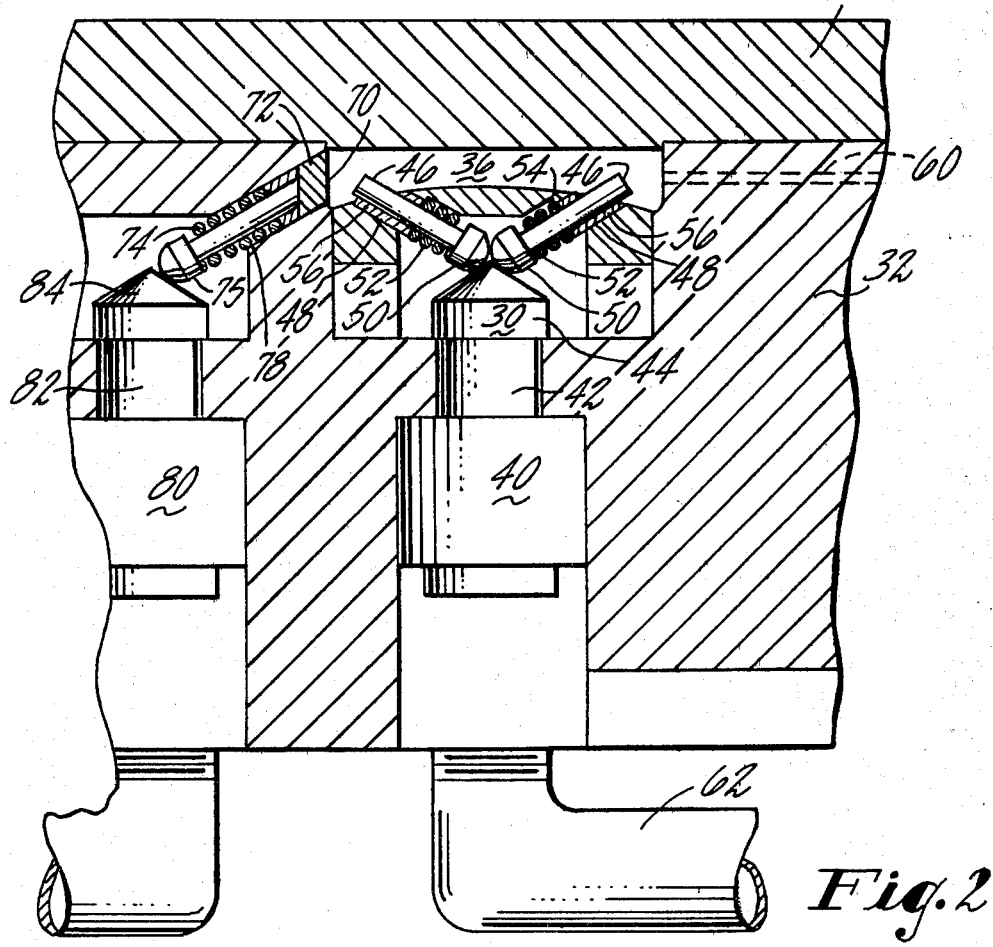
FIG. 2 is a cross-sectional view of a pair of typical mold-halves with the novel channel forming mechanism also shown therewith.

A channel forming mechanism 30, is shown in FIG. 2, wherein a first mold half 32 may support a second mold half 34, between which, a mold cavity 36 is defined. The mechanism 30 may be arranged in the first mold half 32, which mechanism 30 comprises a pressurizable cylinder arrangement 40 having a piston therein, not shown, with a shaft 42 extending therefrom. A plunger cap 44 is secured to the distal end of the shaft 42 connected to the piston. The plunger cap 44 is preferably of conical configuration, its base being attached to the shaft 42. A pair of longitudinally reciprocable pins 46 are each disposed in a sleeve bushing 56 which are arranged in a channel 48 in the first mold half 32. The pins 46 each have a hemispherical head 50 which are each in rubbing contact with the conical surface of the plunger cap 44. A spring 52 is arranged between a shoulder 54 in each channel 48 and the flat annular surface of each hemispherical head 50. The bushing 56 may be disposed in the channel 48 to provide proper slidable support of the pins 46 therein.

A supply conduit 60 is arranged to feed the thermoplastic material from a pressurized thermoplastic material supply source, not shown, to the mold cavity 36. A pressurized fluid supply conduit 62 is arranged to feed pressurizable fluid from a proper source, not shown, to the pressurizable cylinder arrangement 40.

In operation of the mechanism 30, upon injection of a thermoplastic material through the supply conduit 60 into the mold cavity 36, the pressurizable cylinder arrangement 40 may be actuated by proper means from the supply conduit 62, causing movement of the piston therein, to longitudinally move the shaft 42 together with the plunger cap 44 on its distal end. Movement of the plunger cap 44 towards the mold cavity 36, causes pressure between the plunger cap 44 and the hemispherical heads 50 on the reciprocably biased pins 46. The pins 46 are thus caused to extend into the mold cavity 36 and against the side walls thereof in this particular application. After the thermoplastic material injected into the mold cavity 36 has properly set, the pressure in the pressurized fluid supply conduit 62 may be released by proper means, effectuating retraction of the piston and attached shaft 42 into the cylinder 40 and also permitting withdrawal of the pins 46 from the now set thermoplastic material in the mold cavity, because of the biasing action of the springs 52 between the shoulders 54 in the channels 48 enclosing the biased pins 46, and the heads 50 on the pins 46. The biased pins 46 and the shaft 42 attached to the piston, not shown, thus move inwardly, generally towards the cylinder arrangement 40. The second mold half 34 may then be removed to expose the unit sole 10 formed by the set thermoplastic in the mold cavity 36. Since the biased pins 46 are withdrawn from the unit sole 10, the unit sole 10 may be easily removed from the mold cavity 36, which cavity 36 may thereupon be reassembled, ready to receive a subsequent injection of thermoplastic material. It is to be noted that the pressurizable cylinder 40 may be a proper electrically actuated solenoid or a hydraulic cylinder actuated by a proper hydraulic circuit and function in a manner similar to a pressurizable cylinder.

This channel forming mechanism 30 in a further embodiment, could be adapted to fabricate a relief design in the side portions 24 of a unit sole 10, by being angularly arranged adjacent and connectively support a die 70 which may comprise a portion of wall of the mold cavity 36 on either one or both sides thereof, as might be dictated by the particular design characteristics, only one side being embossed here. The die 70 would then be retractable further into the chamber 72 in the side wall of the mold half under the bias of a spring 74 disposed about a pin 76 connected to the die 70, the pin 76 being displaceable in a channel 78, allowing the impressioned unit sole to be removed from the mold cavity, in a manner similar to the aforementioned embodiment utilizing the biased pins. The die 70 may be movable towards and retractable from the mold cavity 36 by a pressurizable cylinder 80 having a shaft 82 and a cone 84 in sliding contact with a head 75 of the pin 76 thereon similar to the afornmentioned cylinder arrangement.

Thus there has been shown and described a unique apparatus facilitating the fabrication of unit soles for shoes or sandals, wherein channels or depressed features may efficiently be cast in the material during the injection of material in the mold cavity by a retractable mechanism which will allow easy removal of the set unit sole from the mold cavity.

I claim:

1. A mold apparatus which defines a shoe sole mold cavity and a conduit for injecting material into said shoe sole mold cavity;
   a reciprocably movable mechanism which forms impressions in the side wall and through the sole material injected in said mold cavity;
   said reciprocably movable mechanism comprising a pressurizable piston and cylinder unit in rubbing contact with a pair of biased pins to effect proper motion therebetween, said pins being supported in channels directed towards said mold cavity;
   said pins being biased by springs which are engaged between a shoulder in said channels, and a head on one end of each of said pins, said biasing being effective to force said pins to retract from said mold cavity upon depressurization of said cylinder unit.

* * * * *